US007652783B2

(12) United States Patent
Kodimer et al.

(10) Patent No.: US 7,652,783 B2
(45) Date of Patent: Jan. 26, 2010

(54) SYSTEM AND METHOD FOR HOLDING AND DELETING REQUESTS IN A JOB QUEUE

(75) Inventors: Marianne Kodimer, Huntington Beach, CA (US); Harpreet Singh, Orange, CA (US); Mustafa Seifi, Irvine, CA (US); Ken Stephenson, San Clemente, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 825 days.

(21) Appl. No.: 11/281,550

(22) Filed: Nov. 17, 2005

(65) Prior Publication Data

US 2007/0109597 A1    May 17, 2007

(51) Int. Cl.
*G06K 15/00* (2006.01)
(52) U.S. Cl. ................. 358/1.16; 358/1.13; 358/1.14; 358/1.15; 358/402; 358/1.12; 358/1.1
(58) Field of Classification Search ............... None
See application file for complete search history.

(56) References Cited

U.S. PATENT DOCUMENTS

| | | | | |
|---|---|---|---|---|
| 6,573,910 | B1 * | 6/2003 | Duke et al. | 715/740 |
| 2002/0063887 | A1 * | 5/2002 | White | 358/1.15 |
| 2002/0196452 | A1 * | 12/2002 | Komiya | 358/1.1 |
| 2003/0009392 | A1 * | 1/2003 | Perkowski | 705/26 |
| 2004/0130746 | A1 * | 7/2004 | Wu | 358/1.15 |
| 2004/0196491 | A1 * | 10/2004 | Uchino | 358/1.15 |
| 2005/0189410 | A1 * | 9/2005 | Brown et al. | 235/379 |
| 2005/0275885 | A1 * | 12/2005 | Sugiyama | 358/1.15 |
| 2006/0017966 | A1 * | 1/2006 | Ormond | 358/1.15 |
| 2006/0221375 | A1 * | 10/2006 | Nagarajan et al. | 358/1.14 |
| 2006/0268323 | A1 * | 11/2006 | Hashimoto | 358/1.15 |
| 2007/0041037 | A1 * | 2/2007 | Golovchinsky et al. | 358/1.15 |

* cited by examiner

*Primary Examiner*—Twyler L Haskins
*Assistant Examiner*—Pawandeep S Dhingra
(74) *Attorney, Agent, or Firm*—Tucker Ellis & West LLP

(57) ABSTRACT

This invention is directed to a document processing system and method. The method begins with a user logging onto a document processing system, inputs identification data, and selects one or more documents for document processing by the document processing system. The selected document is then uploaded to the document processing system, which renders the document to determine the number of pages and other document relevant information. The user then selects one of the available service locations. The cost associated with the requested document processing operation is then calculated and displayed to the user, along with available payment options. Once the user has selected the desired payment method, the document, with selected options and preferences, is transmitted to the selected service location for output on a document processing device thereon. The received request is stored in queue until such time as the user releases the request for further processing. When the request is resident in the queue for greater than a predetermined time, it is deleted automatically. To release the queued document for further processing, the user is required to log onto the document processing device, select the document from a list corresponding to the user, and verify payment. The requested document processing operation is then performed.

8 Claims, 3 Drawing Sheets

SYSTEM AND METHOD FOR HOLDING AND DELETING REQUESTS IN A JOB QUEUE

BACKGROUND OF THE INVENTION

This invention is directed to a document processing system and method. More particularly, this invention is directed to a system and method for holding and deleting document processing requests received from a remote user until user input of instructions at a receiving document processing device.

Generally, a business user modifies, edits, or creates electronic documents from a variety of locations using a personal portable electronic device, such as a laptop computer or a personal data assistant. Locations can vary and include mass transportation, such as while traveling, an office, a home, a coffee shop, and the like. The user is then able to edit or otherwise modify or create electronic documents from any location, provided the user has a portable electronic device. However, the user does not typically travel with a document processing device. When a user desires to output a document, the user must locate a document processing location that is capable of interfacing with the user's personal electronic device and is able to output the electronic document in accordance with the user's commands. Document processing services that are provided outside of traditional office settings, such as airports, hotels, or retail establishments, are used to propagate or to generate electronic documents. Typically, once the user has determined to make use of remote document processing services, the user sends the document to a selected location for output. Unfortunately, the document processing device performing the selected document processing service is usually situated in a public place, affording little to no privacy regarding the output of documents. Secure output is not possible, unless the user is directly present and even then, other jobs may be pending.

Therefore, there is a need for a document processing system and method for holding and deleting received document processing requests associated with a document processing queue.

SUMMARY OF THE INVENTION

In accordance with the present invention, there is provided a system and method for holding and deleting document processing requests received from a remote user until user input of instructions at a receiving document processing device.

Still further, in accordance with the present invention, there is provided a system and method for holding, deleting and processing document processing requests received from a remote user, whereupon the user incurs a charge for the performance of the document processing requests.

In accordance with the present invention, there is provided a document processing system. The system includes receiving means adapted to receive an electronic document from an associated remote user. The electronic document includes identification data associated with the associated remote user. The system further includes storage means adapted to store a received electronic document into a storage associated with a document processor. The system also includes prompting means, associated with the document processor, and adapted to prompt a user for login information. Login receiving means are also included to receive the login information from the user. In addition, the system includes comparison means adapted to compare the login information with the identification data and commencement means adapted to commence a document processing operation via the document processor on an electronic document stored in the storage means in accordance with the output of the comparison means.

Still further, in accordance with the present invention, there is provided a document processing method. The method begins with the receipt of an electronic document from an associated remote user. The electronic document includes identification data associated with the associated remote user. Next, the received document is stored in a storage associated with a document processor. The user is then prompted for login information, which is compared with the identification data. A document processing operation is then selectively commenced by the document processor on a stored electronic document in accordance with an output of the comparison step.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for releasing multiple document processing operations. In particular, this invention is directed to a system and method for restricting view access to confidential document processing operations and releasing multiple document processing operations related thereto. More particularly, the present invention is directed to a system and method for selectively releasing and deleting multiple document processing operations in response to the selection of the document processing operations by an authenticated user at an associated document processing device. Preferably, the document processing device is a multifunctional peripheral device, capable of providing scanning, copying, facsimile, printing, document management, document storage, electronic mail, and other functions to a user.

Figure 1:
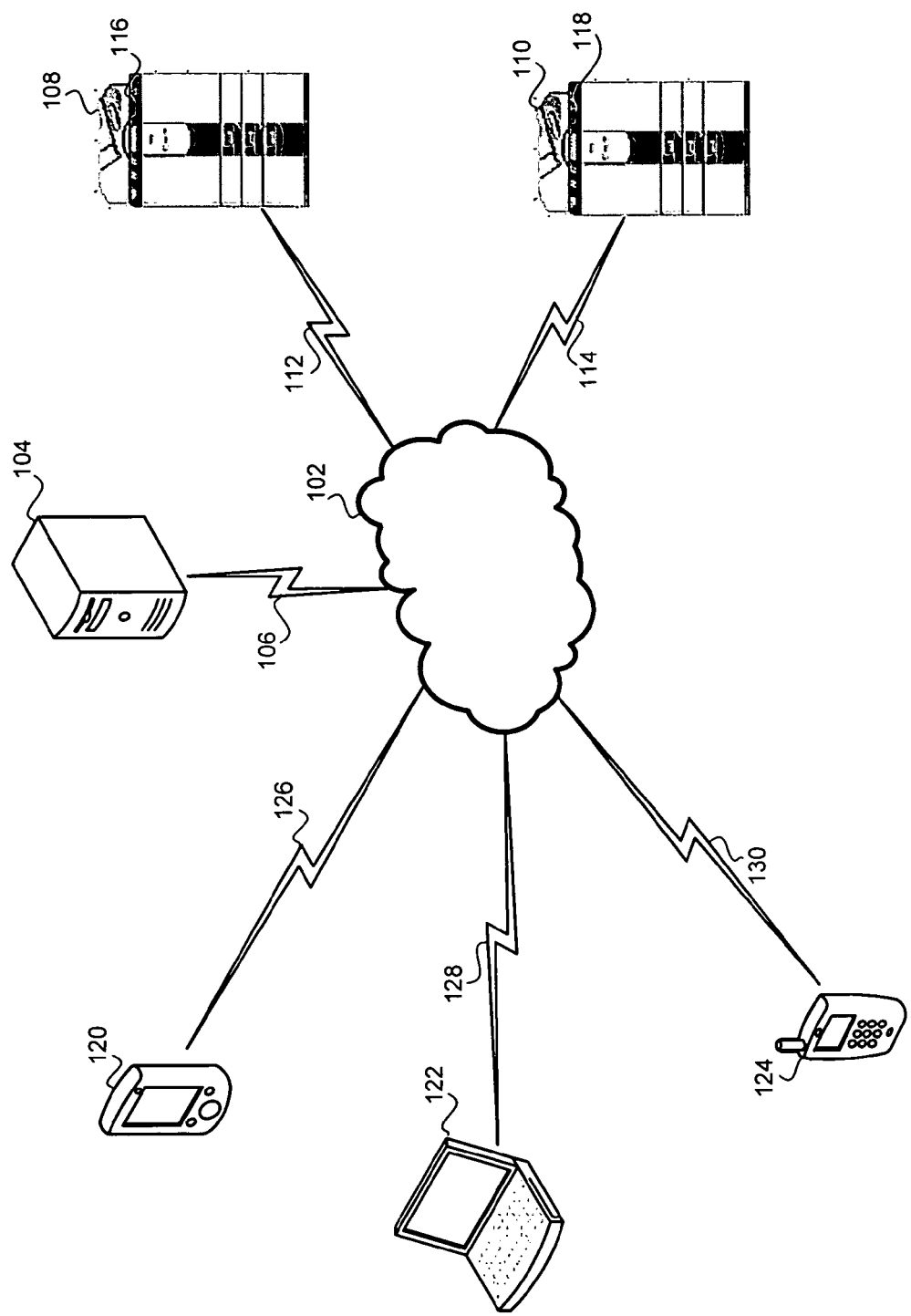
FIG. 1 is a block diagram of the system according to the present invention.

Turning now to FIG. 1, there is shown a system 100 in accordance with the present invention. As shown in FIG. 1, the system 100 suitably includes a computer network 102. It will be appreciated by those skilled in the art that the computer network 102 is any computer network, known in the art, which is capable of enabling the communication of data between two or more electronic devices. As the skilled artisan will appreciate, the present invention is capable of incorporation on any such computer network including, for example and without limitation, Ethernet, local area network, wide area network, personal area network, Token Ring, the Internet, intranets, and the like. In the preferred embodiment, the present invention is employed over a corporate network, such as a local area network. The skilled artisan will appreciate that the present invention is equally capable of being employed on a wide area network, a wireless local area network, the Internet, and the like. In one embodiment, the computer network 102 is suitably equipped with administratively-enabled security protocols, such as unique user identification/password combinations, to control access to the computer network 102 and any associated electronic devices connected thereto.

The system 100 further includes a backend administrative device, illustrated in FIG. 1 as the server 104. Preferably, the server 104 facilitates the administration of a non-geographically limited document processing system, which is adapted to provide fee-based document processing services to a plurality of subscribing users, pay-as-you-go users, or any combination thereof. In the preferred embodiment, the server 104 maintains account information corresponding to users subscribing to the document processing system, as well as other administrative data, such as the location of service locations containing one or more document processing devices suitably adapted to perform document processing services for the subscribing users. The server 104 is communicatively coupled to the network 102 via a communications link 106. Preferably, the communications link 106 is a secure link so as to maintain credit card and account information received from the subscribing users, passwords, and the like.

The system 100 also includes one or more service location providers, containing one or more document processing devices. FIG. 1 illustrates two document processing devices 108 and 110 as examples of at least one of the document processing devices present at two different service locations. It will be appreciated by those skilled in the art that the service locations are any retail establishment, airport lounge, hotel, library, kiosk, stand-alone multifunction peripheral devices, and the like, suitably capable of providing document processing services. The skilled artisan will further appreciate that the two document processing devices 108 and 110 are advantageously represented in FIG. 1 as a multifunction peripheral device, suitably adapted to provide a variety of document processing services, such as, for example and without limitation, scanning, copying, facsimile, printing, and the like. Suitable commercially available image generating devices include, but are not limited to, the Toshiba e-Studio Series Controller. In one embodiment, the document processing devices 108 and 110 are suitably equipped to receive a plurality of portable storage media, including without limitation, Firewire, USB, SD, MMC, XD, Compact Flash, Memory Stick, and the like.

The document processing devices 108 and 110 are communicatively coupled to the computer network 102 via communications links 112 and 114, respectively. The communications links 112 and 114 are any suitable channels b of data communications known in the art including, but not limited to wireless communications, for example and without limitation, Bluetooth, WiMax, 802.11a, 802.11b, 802.11g, 802.11(x), infrared, optical, or any suitable wireless data transmission system, or wired communications known in the art. In the preferred embodiment of the present invention, the document processing devices 108 and 110 further include user-interfaces 116 and 118, respectively. More preferably, the user-interfaces 116 and 118 are touch-screen user-interfaces, however any other suitable means of user interaction, such as an alphanumeric keypad, mouse, LCD, or any combination thereof, are equally capable of being employed to receive instructions from the user.

In addition, the system 100 includes one or more client devices, illustrated in FIG. 1 as a personal data assistant 120, a laptop computer 122, and a web-enabled smartphone 124. Other client devices are equally capable of being employed in accordance with the present invention, without departing from the scope thereof. Each of the client devices 120, 122, and 124 is suitably equipped to communicate with the computer network 102 via an associated communications link 126, 128, and 130. As will be understood by those skilled in the art, the communications links 125, 128, and 130 are representative of a plurality of communications channels which the client devices 120, 122, and 124, are capable of using to exchange data with the network 102. Thus, for example and without limitation, the communications links 126, 128, and 130 are any wired or wireless data communications channel known in the art, such as Bluetooth, WiMax, 802.11a, 802.11b, 802.11g, 802.11(x), infrared, optical, and the like. For example and without limitation, suitable client devices include a smart phone, a personal data assistant, a desktop computer, a web-enabled cellular communications device, and the like.

In operation, a user, associated with one of the client devices 120-124, logs onto the document processing system, via any means known in the art. For purposes of example, reference will be made herein using a single client device 120, however the skilled artisan will appreciate that any client device, suitably capable of interacting with the computer network 102 and adapted to communicate with the document processing system is capable of being employed. Preferably, the user, via the client device 120, inputs a suitable password/username combination, account number, or other identification data associated with the user. The log in attempt is made via the computer network 102 to the server 104, which either allows the client device 120 access to the document processing system, i.e., the available document processing devices 108 and 110. At the client device 120, the user selects one or more documents, preferably stored locally on the device 120, for document processing by the document processing system. The selected document is then uploaded to the document processing system, which renders the document to determine the number of pages and other document relevant information. In an alternate embodiment, the document is stored on a remote storage device (not shown). In this embodiment, the client device 120 directs the document processing system to retrieve the remotely stored document, using for example, and without limitation, an electronic mail message, a uniform resource locator, and the like.

The user, via the client device 120, is then prompted to select one of the available service locations. Preferably, the server 104 only allows the client device 120 to select from service locations capable of performing the selected document processing operation. The user then selects various output options and preferences using the client device 120. These preferences and options, along with identification data associated with the submitting user, are then included in any subsequent transmission of the document to a selected service location. The server 104 then calculates the cost associated with the selected document processing operation and presents these costs to the user for approval. In accordance with one aspect of the present invention, the user is presented with a variety of payment options, including, without limitation, a prepaid account, credit card, payment upon completion, corporate or group account, and the like. Once the user has selected the desired payment method, the document, with selected options and preferences, is transmitted to the selected service location for output on a document processing device thereon. For purposes of example, the user selects the service location containing the document processing device 108.

The document processing device 108 receives the document processing request containing the one or more selected documents and corresponding preferences. The request is stored in a queue communicatively coupled to the document processing device 108 until such time as the user releases the request for further processing. When the request is resident in the queue for greater than a predetermined period of time, for example greater than twenty-four hours, the document processing device 108 automatically deletes the request, thereby increasing the amount of available space in the queue for other document processing requests and preventing other users from accessing the queued electronic document. To release the queued document for further processing, the user is required to log onto the document processing device 108. Preferably, the service location, and therefore the document processing device 108, is a stand-alone kiosk. The user logs onto the document processing device 108 via the associated user-interface 116. In accordance with the present invention, the log in attempt made by the user requires that the logon information provided by the user correspond to identification information associated with at least one document processing request resident in the queue.

Once the user has been authenticated, a list is displayed, via the user-interface 116, containing those document processing requests associated with the authenticated user. The user then selects one of the associated documents for release from the queue for further processing by the document processing device 108. The pricing and payment calculations are then performed and the user is prompted for approval of the pricing and input of the payment. Once payment has been arranged, the selected document is subjected to the selected document processing operation. In one embodiment, the associated user-interface 116 displays the progress or status of the document processing operation. The foregoing system will better be understood in conjunction with the flowcharts of FIGS. 2 and 3, discussed below.

Figure 2:
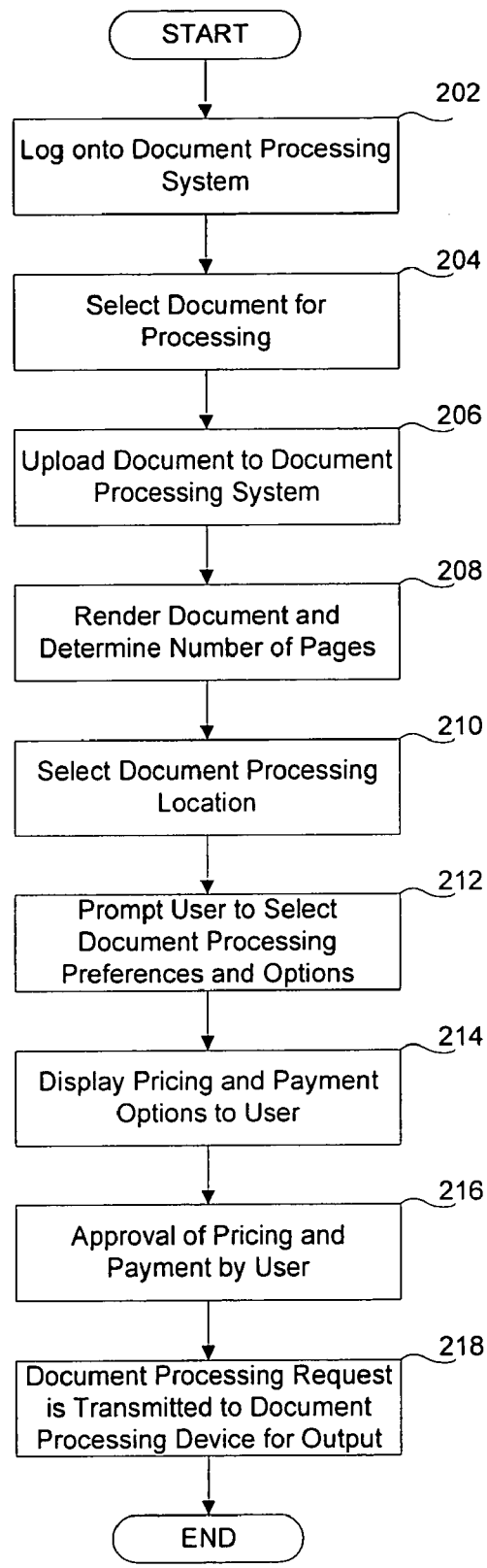
FIG. 2 is a flowchart illustrating the user side of the method according to the present invention.

Turning now to FIG. 2, there is shown a flowchart 200 illustrating the user side of the operation of the system 100 in accordance with the present invention. In accordance with the present invention, the method begins at step 202, wherein the user logs onto the document processing system via the client device 120. Preferably, the user is a subscribing member of the document processing system, employing a prepaid or corporate account. The login information suitably includes, but is not limited to, an account number, a username, a password, biometrics, or any combination thereof. The user is then prompted to select a document to be associated with a document processing request at step 204. It will be understood by those skilled in the art that the designation of a document herein includes, but is not limited to, electronic document data stored locally with respect to the client device 120, data stored remotely, identified by a pathname, uniform resource locator, memory address, or any combination thereof. Irrespective of the location of the electronic document data, the selected document is uploaded to the document processing system at step 206. In the event that the selected document is not located locally relative to the client device 120, the document processing system retrieves the designated document from the identified storage location via any means known in the art.

The selected document is then rendered to determine the number of pages to be processed, as well as other processing information, at step 208. At step 210, the user selects a service location at which a document processing device 108 will perform the desired document processing operation. In one embodiment, the user is presented with a listing of service locations organized in relative proximity to the current location of the client device 120, in accordance with previously selected service locations, in accordance with preselected geographic data, or any combination thereof. At step 212, the user is prompted to select document processing preferences and options, such as, for example and without limitation, finishing options, color, quality, and the like. Pricing and payment options are then displayed to the user for selection thereof at step 214. The user approves the fee associated with the selected document processing operation and selects the desired payment method via any suitable means at step 216, whereupon the document processing request is transmitted to the designated service location, i.e., document processing device 108 at step 218.

Figure 3:
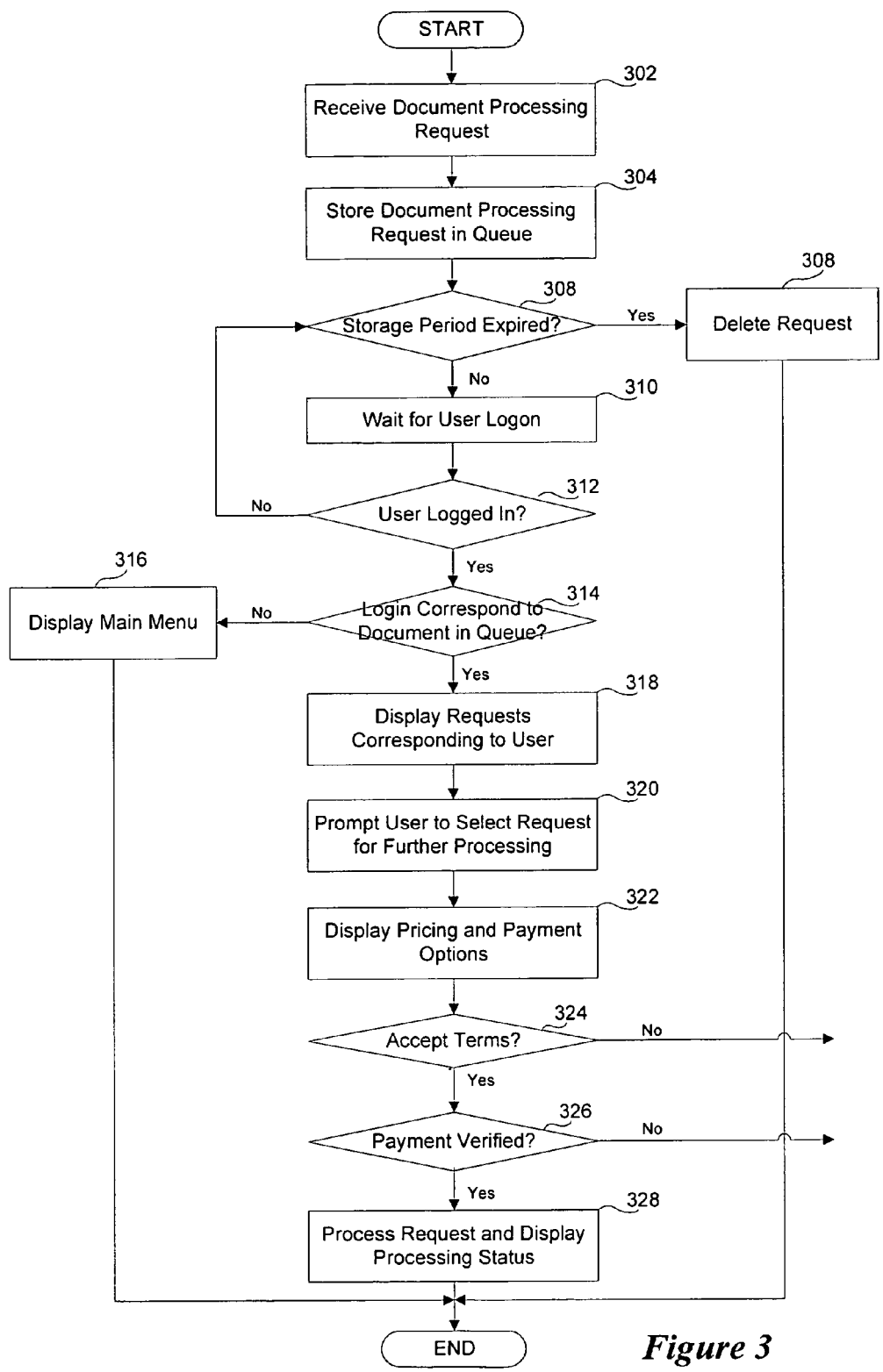
FIG. 3 is a flowchart illustrating the document processing device side of the method according to the present invention.

Referring now to FIG. 3, there is shown a flowchart 300 illustrating the document processing device side of a method in accordance with the present invention. The method begins at step 302 wherein the document processing device 108 receives a document processing request from a remote user. As previously discussed, the document processing request includes electronic document data, identification data, preference and option data, and the like. The received document processing request is then stored in a queue associated with the document processing device 108 at step 304. It will be appreciated by those skilled in the art that the queue is preferably stored on a queue on an associated memory area of the document processing device 108. In accordance with the present invention, a document is only stored in the queue for a predetermined period of time, unless the user instructs the document processing device 108 to retain the document for a longer period. Thus, the document processing device 108 removes any document in the queue that has exceeded a predetermined period of storage time. At step 306, the document processing device 108 determines which of the documents stored in the queue has exceeded the predetermined period of storage time. In accordance with a preferred embodiment of the present invention, the predetermined period of storage time is twenty-four hours, however other time periods, greater than or less than twenty-four hours, are equally capable of being instituted by the present invention.

When a document has resided in the queue for longer than the predetermined period of storage time, flow proceeds to step 308, wherein the document is deleted from the document processing device 108. The operations with respect to that particular document thereby are terminated and the process ends. When the document has not exceeded the predetermined period of storage, flow proceeds to step 310, wherein the document processing device 108 waits for user login corresponding to the documents stored on the queue and submitted by that particular user. A determination is then made for each document resident in the queue whether or not the corresponding user has logged onto the document processing device 108 at step 312. When the user has not logged on, flow returns to step 306 to determine whether the predetermined period of storage has expired and the process continues from there as previously discussed. When the user, corresponding to one or more of the document processing requests contained within the queue has logged on at step 312, flow proceeds to step 314 wherein the document processing device 108 uses user identification information received via the user login to determine whether any jobs stored in the queue correspond to the user identified by the user identification information. It will be understood by those skilled in the art that the document processing device 108 uses the identification data received with each document processing request to correlate the request with a logged on user.

When no document processing requests stored in the queue correspond to the logged on user, flow proceeds to step 316, wherein a main menu associated with the document processing device 108 is displayed to the user on the associated user-interface 116. It will be appreciated by those skilled in the art that the document processing system of the present invention is not limited solely to transmissions from a client device, rather the system is capable of receiving documents directly at one of the document processing devices 108, 110, via removable storage media, and the like. The skilled artisan will appreciate that in such circumstances, the present invention is capable of begin adapted to facilitate a document processing request on any document stored on the removable storage media. When one or more pending document processing requests do correspond to the identification data input by the user at logon, flow proceeds to step 318, wherein the document processing device 108 displays all requests corresponding to the authenticated user via the associated user-interface 116. The document processing device then prompts the user to select one or more documents to be released for further processing at step 320.

Once the user has selected one or more documents for further processing, a fee is calculated corresponding to a variety of factors, and is displayed via the associated user-interface 116 at step 322. In addition, the various payment methods, such as for example and without limitation, credit card, cash, group or corporate account, or the like, is displayed at step 322. It will be appreciated by those skilled in the art that suitable factors include, but are not limited to, type of paper, ink, toner, size, priority, discounts, coupons, group plans, and the like. A determination is then made at step 324 whether the user has accepted the charges and authorized payment. When the user refuses the charges, the operation terminates. When the user has authorized payment, the payment is verified at step 326. If the payment cannot be verified, the document processing request is refused and the operation terminates. When the payment has been verified, flow proceeds to step 328, wherein the document processing device 108 performs the selected document processing operation and the associated user-interface 116 displays the progress of the operation thereof. The method of FIG. 3 then terminates upon successful completion of the selected document processing operation.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

While in the preferred embodiment the present invention is implemented in software, as those skilled in the art can readily appreciate it may also be implemented in hardware or a combination of software and hardware. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A document processing system comprising:
means adapted for generating a display on a portable electronic device corresponding to available document processors and initial document processing options associated therewith; means adapted for receiving an electronic document and document processing instructions associated therewith selected from the displayed document processing options from an associated remote user, the electronic document including identification data associated with the associated remote user;
means adapted for logging a receipt time of the electronic document;
storage means adapted for storing a received electronic document into a storage associated with a document processor for a preselected duration;
means associated with a user interface integrated with the document processor adapted for prompting a user for login information;
means adapted for receiving login information at the user interface;
comparison means adapted for comparing login information with identification data;
display means adapted for displaying cost data to the user after receipt of login information, the cost data associated with a cost of completing a document processing operation on the electronic document in accordance with received document processing instructions;
means adapted for displaying duration data corresponding to time remaining until deletion of the electronic document in accordance with the receipt time and the preselected duration;
means adapted for generating a display corresponding to secondary options available for processing of the electronic document;
means adapted for receiving modified document processing options selected from the secondary options;
means adapted for displaying pricing and payment option data corresponding to the electronic document, the initial document processing options and the secondary options;
means adapted for receiving selection data corresponding to a selected payment option in accordance with displayed payment option data; and
means for selectively commencing a document processing operation, via the document processor, on an electronic document stored on the storage means in accordance with an output of the comparison means.

2. The document processing system of claim 1, further comprising means adapted for receiving, from the user, selection data representative of a desired commencement of the document processing operation by the user.

3. The document processing system of claim 1, wherein the display means further includes means adapted for simultaneously displaying cost data associated with a plurality of electronic documents associated with the user after receipt of login information.

4. The document processing system of claim 3, further comprising means adapted for performing the document processing operation upon payment of the cost data associated with the completion of the document processing operation.

5. A document processing method comprising the steps of:
generating a display on a portable electronic device corresponding to available document processors and initial document processing options associated therewith;
receiving an electronic document and document processing instructions associated therewith selected from the displayed document processing options from an associated remote user, the electronic document including identification data associated with the associated remote user;
logging a receipt time of the electronic document:
storing a received electronic document into a storage associated with a document processor for a preselected duration;
prompting a user for login information at a user interface integrated with the document processor;
receiving login information at the user interface;
comparing login information with identification data;
displaying cost data to the user after receipt of login information, the cost data associated with a cost of completing a document processing operation on the electronic document in accordance with received document processing instructions;
displaying duration data corresponding to time remaining until deletion of the electronic document in accordance with the receipt time and the preselected duration;
generating a display corresponding to secondary options available for processing of the electronic document;
receiving modified document processing options selected from the secondary options;
displaying pricing and payment option data corresponding to the electronic document, the initial document processing options and the secondary options;
receiving selection data corresponding to a selected payment option in accordance with displayed payment option data; and
selectively commencing a document processing operation, via the document processor, on a stored electronic document in accordance with an output of the comparison step.

6. The document processing method of claim 5, further comprising the step of receiving, from the user, selection data representative of a desired commencement of the document processing operation by the user.

7. The document processing method of claim 5, further comprising the step of simultaneously displaying cost data associated with a plurality of electronic documents associated with the user after receipt of login information.

8. The document processing method of claim 7, further comprising the step of performing the document processing operation upon payment of the cost data associated with the completion of the document processing operation.

* * * * *